March 17, 1959     J. R. GRANAN ET AL     2,877,968
COMBINED MANUAL AND AUTOMATIC SERVOMOTOR APPARATUS
Filed Oct. 28, 1954     2 Sheets-Sheet 1
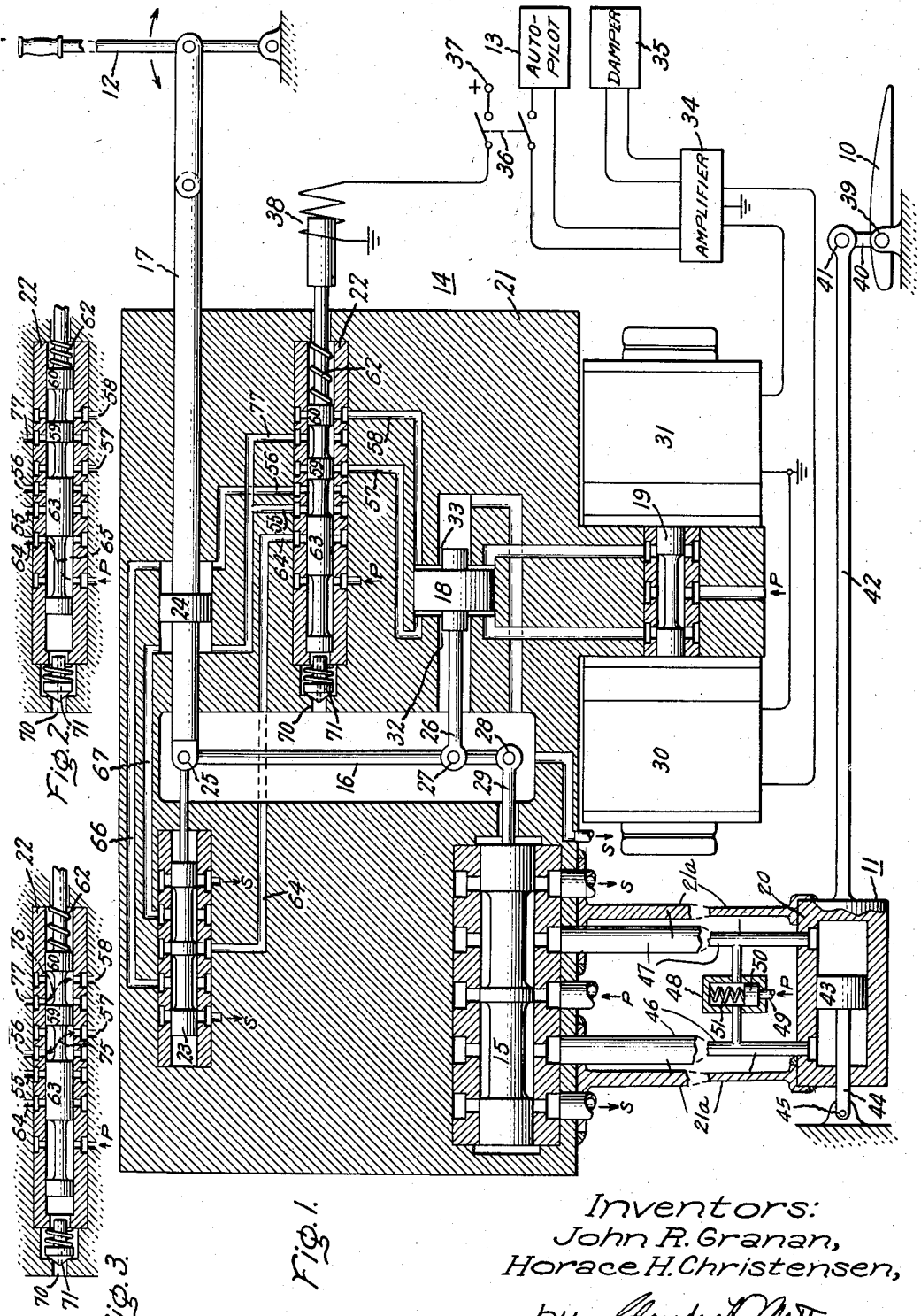
Inventors:
John R. Granan,
Horace H. Christensen,
by Claude A. Mott
Their Attorney.

March 17, 1959 J. R. GRANAN ET AL 2,877,968
COMBINED MANUAL AND AUTOMATIC SERVOMOTOR APPARATUS
Filed Oct. 28, 1954 2 Sheets-Sheet 2
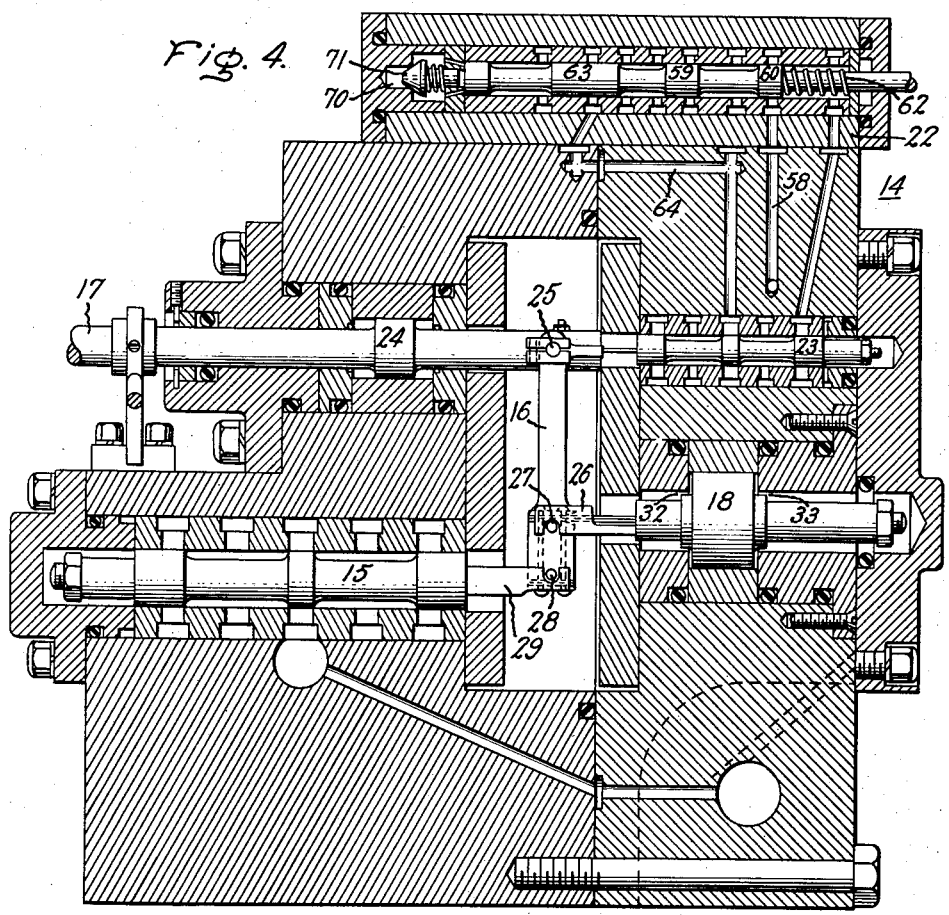
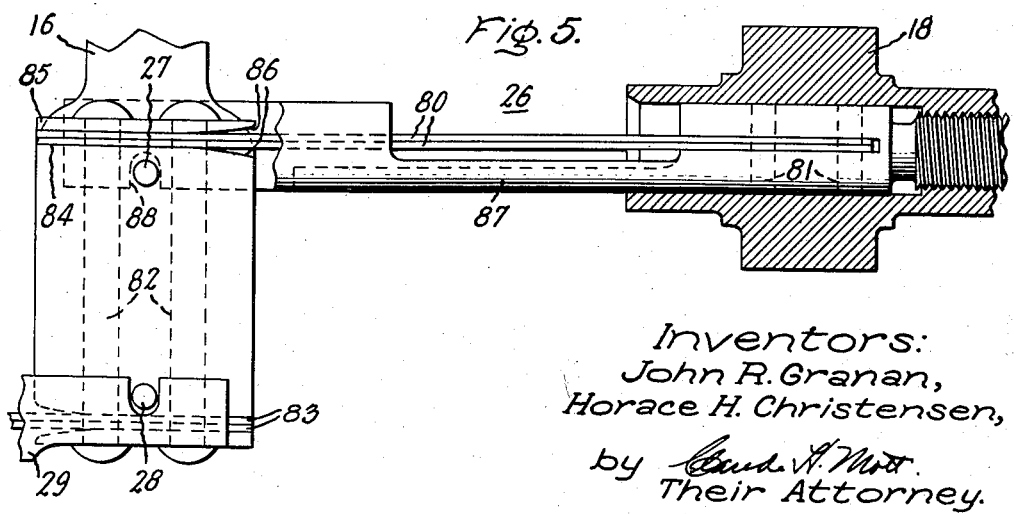
Inventors:
John R. Granan,
Horace H. Christensen,
by *Claud. A. Mott*
Their Attorney.

United States Patent Office 2,877,968
Patented Mar. 17, 1959

2,877,968

COMBINED MANUAL AND AUTOMATIC SERVOMOTOR APPARATUS

John R. Granan, Scotia, and Horace H. Christensen, Schenectady, N. Y., assignors to General Electric Company, a corporation of New York Application October 28, 1954, Serial No. 465,178

10 Claims. (Cl. 244—78)

This invention relates to combined manual and automatic servo motor apparatus and more particularly to such apparatus of the hydraulically actuated type which is particularly adapted for the combined manual and automatic control of the direction of travel or of the attitude of flight of an aircraft vehicle.

In the control of modern high speed vehicles, and particularly in the control of high speed vehicles such as aircraft at speeds approaching and sometimes exceeding the speed of sound, the forces required at the control surfaces of the vehicle frequently exceed those which the pilot is capable of supplying for a sustained period without excessive fatigue.

Accordingly, it is one object of the present invention to provide an improved servo motor apparatus for the control of the direction of travel or the attitude of a dirigible vehicle in which the mechanical control forces supplied manually by the operator are amplified to reduce the required input force.

Another serious problem in connection with the design and control and operation of such high speed vehicles is that it is very difficult and therefore often uneconomical to design the vehicles themselves for inherent stability of operation and control.

Accordingly, it is a further object of this invention to provide an improved system for the control of the direction and attitude of a high speed vehicle in which automatic damping or stabilizing control input signals are mixed with the manual input to provide a combined stabilized manual control of the vehicle.

A further problem in the operation of modern high speed vehicles such as aircraft is that the operator may, of necessity, be occupied with numerous activities other than the immediate operation of the vehicle such as problems of navigation or the operation of radio communication equipment.

Accordingly, it is a further object of this invention to provide an improved automatic piloting apparatus for controlling the direction of travel or the attitude of a high speed vehicle.

If there should be any fault or error in the operation of the autopilot apparatus, or a failure of the apparatus, it is obviously extremely important that the operator may immediately establish manual control of the vehicle.

Accordingly, it is a further object of this invention to provide an automatic piloting apparatus for the automatic control of a high speed vehicle which may be immediately overpowered at any time by the exertion of a sufficient force in order to establish overriding manual control of the vehicle without the preliminary necessity for shifting the positions of any control system switching devices.

A further object of the invention is to provide an improved combined manual and automatic servo motor apparatus for control of the direction of travel or of the attitude of a high speed vehicle which may be operated in any one of several different modes such as manually, or manually with power amplification, or manually with power amplification and automatic damping (stabilization) or entirely automatically and in which, for the purpose of safety, manual control of the vehicle may be asserted and established by the exertion of sufficient force, within the range of the strength capabilities of a typical operator, without the necessity for any preliminary switching operations.

Further objects and advantages of this invention will be apparent from the following description and the accompanying drawings.

In carrying out the objects of this invention in one preferred embodiment thereof, apparatus is employed including a casing enclosing hydraulic apparatus in which the casing itself is connected through mechanical linkages for movement with the vehicle control surface which is to be positioned by the apparatus. The housing and the control surface are positionable by means of a hydraulic power piston, the movement of which is controlled by a null centering hydraulic pilot valve. The pilot valve is positionable through a pivotally connected control lever which, in turn, is positionable through pivotable connections to manually operated and automatically operated connecting rods. The manual connecting rod is arranged for hydraulic centering operation during automatic operation of the system, and the automatically positioned connecting rod is arranged for hydraulic centering during manual operation of the system or for the addition of automatic control signals through a separate hydraulic servo system for the introduction of stabilization or automatic piloting signals.

For a more complete understanding of the invention reference should be made to the following specification and the accompanying drawings in which:

Figure 1 is a schematic diagram of one preferred embodiment of this invention;

Figures 2 and 3 are detail views of the hydraulic transfer valve of Figure 1 showing the operation of the transfer valve in shifting the hydraulic connections for changing between manual and automatic operation;

Figure 4 is a sectional view of a representative portion of a practical physical embodiment of the invention; and, Figure 5 is a detail view showing the structure of the pivotal connections employed in the embodiment of Figure 4.

Referring more particularly to Figure 1, there is shown a control surface 10 such as may be positioned by the servo motor apparatus of this invention, and which is connected through a suitable linkage for actuation by a hydraulic power piston assembly indicated at 11 in response to manual input signals which may be provided by movement of a manual lever 12, or in response to automatic flight control signals which may be provided from an autopilot indicated at 13. The manual signals from lever 12 and the automatic signals from autopilot 13 are supplied to the servomotor control apparatus generally indicated at 14 for the control of the power piston 11. The immediate control of the power piston assembly 11 is accomplished by means of a null centering pilot valve 15 which is positioned by means of a pivoted control lever 16. The control lever 16 is, in turn, directly positionable through a connecting rod 17 by the manual control lever 12 and by a two-stage hydraulic servo system having a second-stage output piston 18 and a pilot valve 19 which is electrically controlled by the autopilot 13.

The power piston assembly 11 includes a housing 20, and the servo motor control apparatus 14 includes a housing 21. These housings 20 and 21 are preferably fixed to one another for common movement by any suitable means such as the supports 21a illustrated. It will thus be seen, particularly from the description that follows, that a positioning connection is maintained between the manual control lever 12 and control surface 10. This provides for a motion of the manual lever 12 to follow the position of the control surface 10, even when the apparatus is operating automatically, and it also permits manual operation through a lost motion connection even though the electrical and hydraulic portions of this system may be inoperative, as will be fully described below.

During periods when the apparatus is used for automatic operation, a solenoid operated hydraulic transfer valve indicated at 22 connects hydraulic pressure fluid to a hydraulic centering servo system including a null centering pilot valve 23 and a power piston 24 which is constructed integrally with connecting rod 17 to maintain the pivotal connection between the connecting rod 17 and the control lever 16, as indicated at 25, at a centered position within the cavity of housing 21 enclosing control lever 16. The operation of the transfer valve 22 will be described in more detail below.

Therefore, when the apparatus is operated automatically in response to signals from autopilot 13, the upper pivot point at 25 is effectively a fixed fulcrum pivot for the lever 16 within the housing 21. The motions imparted from the automatic control hydraulic servo arrangement including pilot valve 19 and the second-stage piston 18 are transmitted through the connecting rod of the piston 18, designated as 26, to the pivotal connection with the control lever 16 indicated at 27, with a directly proportional movement to the pivotal connection indicated at 28 and the connecting rod 29 to impart such proportional movement to the pilot valve 15 to thus control the operation of the power piston 11.

Similarly, when the transfer valve is in the position shown in Figure 1, for operation from the manual input signal from the control lever 12, the pivot 27 of the control lever 16 is maintained in a centered position within the housing 21 by automatic hydraulic centering of the second-stage piston 18. This mode of operation is obtained because the solenoid operated pilot valve 19 includes solenoids 30 and 31 which are preferably constructed with built-in valve centering springs. A preferred construction which may be employed, for instance, is that shown in Patent #2,435,817 issued on February 10, 1948 to E. R. Boynton et al. and assigned to the same assignee as the present invention. This spring centering position of the pilot valve 19 will be automatically followed or reproduced by the second-stage piston 18 because the combination of the valves 18 and 19 and the associated structure is preferably constructed in accordance with the invention disclosed in co-pending patent application Serial No. 301,444, filed July 29, 1952 by Howard W. Avery for a Hydraulic Amplifier, now Patent No. 2,709,421, issued May 31, 1955. That patent application is assigned to the same assignee as the present application. A principal feature of the structure disclosed in that patent application includes the employment of capillary passages at the ends of the second-stage piston as indicated in Figure 1 at 32 and 33. The lengths of these capillary passages vary as the piston 18 moves. The pressures in the chambers at the ends of the piston 18 are thus equalized by a repositioning of the piston in response to a change in the position of the pilot valve 19 which cause changes in the hydraulic liquid flow rates through the respective end chambers.

The solenoids 30 and 31 are energized by direct current control signals of opposite polarity from a double output amplifier 34, which may be of conventional construction. The output of the amplifier 34 may be controlled by a combination of amplifier input signals derived from the autopilot 13 and from a damper or stabilization apparatus indicted at 35. A two-circuit switching device indicated at 36 may be employed to complete the circuit between the autopilot 13 and the amplifier 34 for automatic operation. At the same time switch 36 connects power through a power terminal indicated at 37 from a suitable electric power source (not shown) to the solenoid 38 for actuation of transfer valve 22 to change certain hydraulic connections for automatic operation, as will be described more fully below.

As mentioned above, the control surface 10 is positioned by the power piston assembly 11. This movement of surface 10 is about a fixed pivot 39, in response to movement of a crank arm 40 which is pivotally connected at 41 to a connecting rod 42 which forms an integral part of the power piston housing 20. The power piston 43 of the assembly 11 includes a connecting rod 44 which is connected at 45 to a fixed pivot.

For the purposes of simplicity and clarity of presentation in the drawing, no source of hydraulic pressure liquid is shown, although it will be understood that a conventional pump or other source of hydraulic pressure liquid is to be employed. Instead, at the inlet connections to which the source of hydraulic liquid under pressure is to be connected, the letter symbol P is employed with an arrow pointing inwardly. Similarly, no low pressure sump or reservoir is shown, but instead, the drain line connections for the sump are indicated by the letter symbol S together with an outgoing arrow.

As stated above, the power piston assembly 11 is under the control of a pilot valve 15. The pilot valve 15 includes a conventional three-land piston for alternatively connecting liquid under pressure to one of the control lines 46 or 47 and for concurrently connecting the other control line to the low pressure sump upon displacement of the piston away from the central null position shown in the drawing.

For purposes of clarity and simplicity, the power piston assembly 11 and the control surface 10, and the apparatus associated therewith have been shown in greatly reduced scale with respect to the remainder of Figure 1. This is indicated by the breaks and the reduction in size of the control lines 46 and 47 between the pilot valve 15 and the power piston assembly 11.

A hydraulic bypass valve 48 is provided between the conduits 46 and 47. When the source of hydraulic pressure liquid is in operation, the pressure therefrom connected at 49 to the bottom of the bypass valve 48 forces the valve piston 50 upwardly against the force of the spring 51. Thus, at regular working pressures of the hydraulic liquid, the interconnection which is otherwise established at the bypass valve 48, between the conduits 46 and 47, is interrupted. Pressure differences within the conduits 46 and 47 can thereby exist to change the position of the power piston 43 within the piston housing 20. However, upon any failure in the pump or other source of hydraulic pressure liquid, the resulting lack of pressure will be detected by a downward movement of the piston 50 in response to the force of the spring 51 to thereby uncover the ports of the bypass valve 48 and establish a hydraulic interconnection between the conduits 46 and 47, as shown in Figure 1. When such an interconnection is established, the hydraulic liquid enclosed on the two sides of the power piston 43 within the housing 20 may be freely interchanged. Manual movement of the control surface 10 through the manual lever 12 and the lost motion connection provided by the connecting rod 17 and the piston 24 with the casing 21 of the servo apparatus is therefore unimpeded.

With the transfer switch 36 in the open position, as shown, the autopilot 13 is not connected to the amplifier 34 so that no automatic piloting signal is supplied to the solenoids 30 and 31. Also, no energizing voltage is supplied to the solenoid 38 of the hydraulic transfer valve 22. In this position of the transfer valve 22, a hydraulic interconnection is provided between the chambers enclosed on the two sides of the hydraulic power piston 24 by means of the conduits indicated at 55 and 56 which are interconnected through the transfer valve bore. Thus, there is no hydraulic restraint to impede the free movement of the manual lever 12 with respect to the control housing 21. Also, the chambers at the respective ends of the second-stage piston 18 are sealed at the transfer valve conduits indicated at 57 and 58 by transfer valve piston lands 59 and 50 covering the associated ports. The pivot 27 of the control lever 16 is thereby maintained in a centered position by the operation of the two-stage servo provided by pistons 18 and 19 as described above.

In the position of the transfer switch 36 and in the condition of the apparatus, as shown in Figure 1, the apparatus constitutes a manually operated hydraulic system in which the manual position signal is amplified and supplemented for achieving the desired movements of the control surface 10. However, the damper 35, which may also be characterized as a stabilization signal device, and which may consist of a conventional apparatus for providing signals in accordance with transient changes in the direction or attitude of the vehicle which is to be controlled, is preferably permanently connected to the amplifier 34. Stabilization signals are thus provided to the solenoids 30 and 31. Damping or stabilization signals may thus be added to the manual signals provided from the manual operator's lever 12 by horizontal movement of the piston 18 and the pivot 27. The control surface 10 is thus positioned in response to a mixture of the manual and stabilization signals provided from these two sources. Obviously, however, the damper 35 may be disconnected, or dispensed with if desired. The spring centering operation of the electromagnetically positioned pilot valve 19 and the second stage piston 18, as described above, will then alone determine the position of pivot 27. This automatic centering operation will be effective whenever there is no signal from the amplifier 34 to the solenoids 30 and 31. This would include the contingency of an electrical failure within the system.

When the switch 36 is closed, the resulting energization of the solenoid 38 provides a movement of the piston of the transfer valve 22 to the right, against the opposition of the spring 62. This new position of the transfer valve is shown in the detail view of Figure 2. It will be seen from Figure 2 that the conduits 57 and 58 are again closed at the transfer valve as each of the asociated conduit ports now communicates with an isolated section of the center bore thereof. However, the large piston land 63 covers the ends of the valve ports associated with both of the conduits 55 and 56 so that the communication between the end chambers associated with piston 24 is interrupted. The new position of the large valve land 63 also uncovers the port associated with a conduit 64 to establish a connection with a liquid pressure inlet port as indicated at 65 in Figure 2. Control pressure is thus applied through the conduit 64 to the center land of the pilot valve 23. Valve 23 is a conventional null centering control valve which, through conduits indicated at 66 and 67 in Figure 1, controls the pressures in the end chambers associated with piston 24 to maintain the upper end of the control lever 16 and the pivot 25 in a centered position within the housing 21 as described above. The effective cross-sectional area of the power piston 24 is chosen to provide a centering force which is adequate to maintain the desired centered relationship during normal operating conditions under automatic control. But the centering force is low enough so that is can be overcome by exertions within the capabilities of the operator upon the manual lever 12, without the necessity for opening switch 36 to shift the transfer valve 22 back to the manual operating position. This feature is thought to be particularly important since the rapid intercession of the operator in the control of the vehicle may be absolutely essential in order to avoid a collision, or for other reasons, when there is insufficient reaction time to permit the preliminary operation of the switch 36.

As described above, when the switch 36 is in the closed position, and the transfer valve 22 is in the automatic control position shown in Figure 2, the signals from the automatic pilot 13 are fed into the amplifier 34 and mixed with the signals from the damper or stabilizer 35 and applied to the pilot piston positioning solenoids 30 and 31 in order to automatically control the vehicle.

It will be understood by those familiar with the operation of such apparatus that a relatively small displacement of the pilot valve 15 will be sufficient to cause an adequately rapid operation of the power piston assembly 11. Accordingly, the maximum displacement provided in the second stage piston 18 is relatively small. By contrast, the axial length of the cylinder bore for the piston 24 associated with the manually operated connecting rod 17 is relatively long. Accordingly, if an incorrect or undesired maximum error signal is provided at the piston 18, the operator may impart sufficient movement to the upper end of the control rod 16 by means of the manual control lever 12 to overcome the signal introduced by the piston 18 and to provide a net reversal in signal, if desired, to reestablish manual control of the vehicle at any time. The mechanical advantage provided for the operator by the lever 16 is obviously important in connection with this mode of operation, as well as an important advantage of the invention.

The existence of such opposed manual and automatic input signals as described in the above paragraph presents a potentially serious control stability problem when the operator has an opportunity to open the switch 36 to reestablish unopposed manual control of the system. A special feature of the transfer valve 22 is designed to overcome this stability problem as described below. The cavity enclosing the control lever 16 forms part of the reservoir of low pressure hydraulic liquid and is therefore continuously substantially filled with hydraulic liquid above the level of the connection with the center bore of the transfer valve 22 as indicated at 70. Accordingly, when the transfer valve piston is pulled to the right by the solenoid 38, there is a relatively unrestrained transfer of hydraulic liquid from the cavity of control lever 16 (housing the control lever 16) into the center bore of transfer valve 22 through a small spring closed valve indicated at 71.

However, when the solenoid 38 is de-energized and the piston of transfer valve 22 is biased to the left by the operation of the spring 62, the resulting hydraulic liquid pressure at the left end of the piston of valve 22 merely tends to close the valve 71 with greater force, and the only remaining exit for such hydraulic liquid is through a very small center bore in the body of valve 71. It will be seen, therefore, that the return of the piston of transfer valve 22 from the "automatic" position shown in Figure 2 to the "manual" position shown in Figure 1 is accomplished at a relatively slow rate of speed.

The connections established within the transfer valve 22 during this delayed return operation are shown by the detail view of Figure 3. It will be seen from this detail view, as indicated by the dotted lines at 75 and 76, that hydraulic interconnections will be established through the cylinder bore in the respective spaces between the valve lands 63, 59 and 60 to interconnect the conduits 56 and 57 and also conduits 58 and 77 to establish cross connections between the respective end chambers of the second-stage valve piston 18 and the manual power piston 24. These interconnections provide for the repositioning of these respective pistons to the central positions shown in Figure 1 smoothly and concurrently, with a minimum change in the consequent position of the control lever pivot 28 and the pilot valve 15. This repositioning will be automatically carried out for the second-stage piston 18 because of the spring centering operation of the pilot valve 19 as described above. The repositioning of the second-stage piston 18 will therefore tend to cause a concurrent repositioning of the piston 24 within the casing 21. This repositioning operation and the delay in the return of the transfer valve piston to the position shown in Figure 1 may be preferably accomplished in a relatively short period, in the order of five seconds or less.

It will be seen from the above description of this apparatus that upon any malfunction or failure of the electrical autopilot system, or upon any other urgent occasion for overpowering the electrical autopilot system, the operator may immediately establish hydraulic control of the apparatus merely by the exertion of sufficient force on the manual lever 12, and by the employment of a lesser force when he is able to open the transfer switch 36. Likewise, the operator can easily overcome any inappropriate signals from the damper or stabilizer device 35 whether the autopilot 13 is connected by the switch 36 or not. However, the signals from the damper 35 are generally only of a transient nature and therefore generally would not cause undesired steady state operation of the system. Similarly, if the hydraulic portions of the system fail, such as a failure which results in the loss of hydraulic liquid pressure within the system, the bypass valve 48 causes a hydraulic release of the power piston assembly 11 to permit manual operation from the lever 12 through the lost motion connection with casing 21 provided at the piston 24.

In Figure 4 there is shown one representative sectional view of a practical physical embodiment of the invention which is schematically shown in Figure 1. Since Figure 4 is not a schematic diagram, it does not show all of the components of the complete system. However, the parts which are shown in Figure 4 are designated by the same numerals as the corresponding parts in the prior figures. The pivoted connections at 27 and 28, as shown in Figure 4, are preferably constructed by the use of flexible connecting rod members. This avoids any lost motion in the pivotal connections.

The details of the construction of Figure 4 employing the flexible connecting rod members are shown in Figure 5, which is an enlarged sectional detail view of the portion of the control lever 16 in the vicinity of pivots 27 and 28 and the connecting rod structures associated therewith. In Figure 5 the connecting rod 26 between the second-stage piston 18 and the pivot 27 is shown to comprise two flexible leaf spring members indicated at 80. The flexible members 80 are securely fastened, such as by pins indicated at 81, to a rigid portion 87 of connecting rod 26, and by similar rivets or bolts indicated at 82 at the control lever 16. The fastening rivets 82 on the control lever 16 may be employed, as shown, to secure the flexible members 80 for the pivot 27, as well as similar flexible members indicated at 83 for the pivotal connection at 28. The constructions for the connecting rods 29 and 26, and at the pivots 27 and 28, are substantially identical and for the purpose of this description reference will be made particularly to the pivot 27 and the connecting rod 26, which is shown in greatest detail.

The rivets 82 hold the flexible connecting rod members 80 between a horizontally extended portion of the control lever 16 having a substantially flat horizontal surface at 84, and a clamping plate 85 which also presents a substantially flat horizontal surface in the portion engaging the flexible members 80. However, the portions of these surfaces at the end of the clamping area extending in the direction of piston 18 are curved as indicated at 86 to form an opening to permit bending of the flexible members 80. This bending takes the place of the pivotal rotation which would occur with a conventional pivot construction, but without requiring any pivot bearing clearances. Such clearances would provide lost motion between the pivot and the connecting rod which would result in a serious reduction in the response of the control system.

However, as a safety measure, in case the flexible members 80 should break due to extended periods of use, the connecting rod 26 preferably also includes the rigid portion 87, which may be referred to as a safety link, having a slotted opening at 88 permitting a straddled positioning over the pivot pin 27. This straddled relationship is maintained at all times and sufficient clearance is provided for the pin 27 within the slot 88 so that there is no engagement therebetween as long as the flexible members 80 remain intact. However, if the flexible members 80 should break, this straddled relationship becomes an effective pivotal connection which serves to maintain the apparatus in operation, even though the lost motion connection between the pivot 27 and the slot 88 may impair the operating efficiency and the quality of the control operation which would otherwise be expected. Thus, the apparatus may continue in operation until repairs can be made.

The following claims are intended to define the valid scope of this invention over the prior art and to cover all changes and modifications falling within the true spirit and valid scope of the invention.

What we claim as new and desire to secure by Letters Patent of the United States is:

1. A combined manual and automatic hydraulic servo control system comprising a hydraulic positioning motor, a null centering hydraulic pilot valve including a movable valve member, said pilot valve being connected for controlling the positioning operation of said motor, a control member, first connection means pivotally connecting said control member to said pilot valve movable member for movment thereof on movement of said control member, manual and automatic input members, and second and third connection means respectively pivotally connecting said manual and automatic input members to separate portions of said control member for introducing separate manual and automatic input position control signals for said pilot valve, at least one of said pivotal connections comprising a flexible member fixedly mounted at each end to one of the two said members connected thereby and adapted for bending in at least one plane in a portion thereof in proximity to said fixed mountings, said one pivotal connection means further comprising a fixed pivot pin carried by one of the two connected members and loosely engaging in an aperture in the other of said members to provide a safety link for maintaining pivotal connection of the members in event of failure of said flexible member.

2. A combined manual and automatic hydraulic servo system comprising a movable hydraulic control housing arranged for connection to a device which is to be positioned, a hydraulic power motor connected to move said housing, a pilot valve within said housing and connected to control the movement of said motor upon adjustment away from a central null position, said pilot valve including a connecting rod, a control lever pivotally connected at one end thereof to said connecting rod, a manual input connecting rod pivotally connected to the other end of said control lever, a second hydraulic power piston mounted within said housing and pivotally connected by means of a third connecting rod to an intermediate portion of said control lever, a second pilot valve including electrical solenoids for the positioning thereof mounted within said housing and hydraulically connected to control the position of said second power piston, and an automatic electrical control apparatus connected to said solenoids to position said second pilot valve.

3. A combined manual and automatic steering system for a dirigible craft comprising a movable hydraulic control housing arranged for connection through a suitable linkage system to a control surface which is to be positioned, a hydraulic power motor connected to move said housing, a pilot valve connected to control the movement of said motor upon adjustment away from a central null position, said pilot valve including a connecting rod, a control lever pivotally connected at one end thereof to said connecting rod, a manual input connecting rod pivotally connected to the other end of said control lever, a second hydraulic power piston including a third connecting rod pivotally connected to an intermediate portion of said control lever, a second pilot valve including electrical solenoids for the positioning thereof and hydraulically connected to control the position of said second power piston, and an automatic pilot apparatus having an electrical output connected to said solenoids to control the position of said second pilot valve.

4. A combined manual and automatic steering system for a dirigible craft comprising a movable hydraulic control housing arranged for connection through a suitable linkage system to a control surface which is to be positioned, a hydraulic power motor connected to move said housing, a pilot valve connected to control the movement of said motor upon adjustment away from a central null position, said pilot valve including a connecting rod, a control lever pivotally connected at one end thereof to said connecting rod, a manual input connecting rod pivotally connected to the other end of said control lever, a second hydraulic power piston including a third connecting rod pivotally connected to an intermediate portion of said control lever, a second pilot valve including electrical solenoids for the positioning thereof and hydraulically connected to control the position of said second power piston, an automatic pilot apparatus having an electrical output connected to said solenoids to control the position of said second pilot valve, and a hydraulic servo system enclosed within said housing and including a third pilot valve, a third power piston hydraulically connected thereto for control thereby, said third power piston being connected to said manually operable connecting rod to maintain a centered position thereof within said housing with a force which does not exceed that which can be overcome manually, and a hydraulic transfer valve for connecting a source of hydraulic liquid under pressure to said servo system for operation thereof when exclusive autopilot control is desired.

5. In a combined manual boost and automatic positioning system for a controlled member, a hydraulic power motor connected to position the controlled member, a control housing connected to said motor for movement with the controlled member, a null-centering pilot valve in said control housing including a first valve element fixed with respect to said housing and a second valve element movable with respect thereto for controlling the positioning operation of said first hydraulic motor, a second hydraulic motor including piston and cylinder members, a control valve for governing operation of said second hydraulic motor responsive to automatic control signals supplied the system during automatic control operation thereof, means for centering the piston of said second hydraulic motor with respect to the cylinder thereof during manual boost operation of the system, a manual input member, means carried by said control housing for centering said manual input member with respect to said control housing during automatic control operation of the system, means connecting one of said second hydraulic motor members to said one pilot valve element fixed in said control housing, and means connecting said manual input member and the other of said second hydraulic motor members to said pilot valve movable element, said last-named connecting means being operative to adjust the position of said pilot valve movable element responsive to movement of said manual input member and to movement of said second hydraulic motor, whereby during automatic operation of the system said manual input member may be centered with respect to said control housing so as to place said pilot valve under exclusive control of said second hydraulic motor and during manual boost operation said second hydraulic motor may either be centered to place said pilot valve under exclusive control of said manual input member or may remain operative to superimpose an automatic control input on the manual input.

6. In a combined manual and automatic control system for a dirigible craft having a steering member, a power motor connected to position the steering member, pilot valve means for controlling the positioning operation of said power motor, automatic control signal means including automatic pilot apparatus and automatic damping apparatus operative to produce control signals indicative respectively of long term and transient steering error, a servomotor operative under control of said control signal means, a manually operable control member, a first input connection between said manually operable control member and said power motor operating means, a second input connection between said automatic control signal operated servomotor and said power motor operating means, a switching device settable in automatic pilot or manual position, means for centering the first input connection to said power motor operating means, means controlled by said switching device when set in automatic pilot position for operating said manual input centering means, said controlled means including a transfer valve which provides rapid centering of said manually operable member when said switch is in automatic pilot position, said transfer valve causing a delay in the centering of said manually operable member when said switch is placed in manual position, and means controlled by said switching device when set in manual position for disabling said automatic pilot apparatus so as to place said automatic control signal operated servomotor under exclusive control of said automatic damping apparatus.

7. In a combined manual and automatic control system for a dirigible craft having a steering member, a hydraulic power motor connected to position the steering member, pilot valve means for controlling the positioning operation of said power motor, automatic control signal means including automatic pilot apparatus and automatic damping apparatus operative to produce control signals indicative respectively of long term and transient steering error, a hydraulic servomotor controlled by a pilot valve including actuating means responsive to said control signal means, a manually operable control member, a first input connection between said manually operable control member and said power motor operating means, a second input connection between said hydraulic servomotor and said power motor operating means, a switching device settable in automatic pilot or manual position, means for centering the first input connection to said power motor operating means, means controlled by said switching device when set in automatic pilot position for operating said manual input centering means, said controlled means including a transfer valve movable to two positions, said transfer valve moving to one position unimpeded when said switch is placed in automatic pilot position and having a delayed movement to a second position when said switch is placed in manual position, and means controlled by said switching device when in manual position for disabling said automatic pilot apparatus so as to place said hydraulic servomotor under exclusive control of said automatic damping apparatus, said hydraulic servomotor including self-centering means automatically operative to center said second input connection to said power motor operating means on failure of said automatic control signal means to thus provide positive manual control of said power motor operating means in event of such failure.

8. In a combined manual and automatic control system for a dirigible craft having a steering member, a first hydraulic motor connected to position the steering member, a control housing connected to said motor for movement with the steering member positioned thereby, a null-centering pilot valve in said control housing including a first valve element fixed with respect to the housing and a second valve element movable with respect thereto for controlling the positioning operation of said first hydraulic motor, a second hydraulic motor including piston and cylinder members, control valve means for governing operation of said second hydraulic motor including valve actuating means responsive to automatic control signals supplied thereto during automatic control operation of the system, means for centering the piston of said second hydraulic motor with respect to the cylinder thereof when no automatic control signal is supplied said valve actuating means, a manual input member, third hydraulic motor means including piston and cylinder elements with one said element fixed in said control housing and one movable therein and connected to a null-centering pilot valve controlling flow of pressure fluid to said motor, said movable motor element being connected to said manual input member for centering said member with respect to said control housing during automatic control operation of the system, means connecting one of said second hydraulic motor members to said one pilot valve element fixed in said control housing, means connecting said manual input member and the other of said second hydraulic motor members to said pilot valve movable element, said last named connecting means being operative to adjust the position of said pilot valve movable element responsive to movement of said manual input member and to movement of said second hydraulic motor, whereby during automatic operation of the system said manual input member may be centered with respect to said control housing so as to place said pilot valve under exclusive control of said second hydraulic motor and during manual operation said second hydraulic motor may either be centered to place said pilot valve under exclusive control of said manual input member or may remain operative to superimpose on the manual control input an automatic control input.

9. In a combined manual and automatic control system for a dirigible craft having a steering member, a hydraulic power motor connected to position the steering member, pilot valve means for controlling the positioning operation of said power motor, automatic control signal means including automatic pilot apparatus and automatic damping apparatus operative to produce control signals indicative respectively of long term and transient steering error, a hydraulic servomotor controlled by a pilot valve including actuating means responsive to said control signal means, a manually operable control member, a first input connection between said manually operable control member and said power motor operating means, a second input connection between said hydraulic servomotor and said power motor operating means, a switching device settable in automatic pilot or manual position, hydraulically energized motor means for centering the first input connection to said power motor operating means, transfer valve means actuated by said switching device when set in automatic pilot position for energizing said manual input centering means, and means controlled by said switching device when in manual position for disabling said automatic pilot apparatus so as to place said hydraulic servomotor under exclusive control of said automatic damping apparatus, said hydraulically energized manual input centering means being manually overridable to enable emergency manual control independently of said automatic control signal means.

10. In a combined manual and automatic control system for a dirigible craft having a steering member, a hydraulic power motor positioned to control the steering member, a manually operable control member, automatic pilot control means, means for controlling the positioning operation of said power motor, a first input connection between said manually operable control member and said power motor operating means, a second input connection between said automatic pilot control means and said power motor operating means, a switching device settable in automatic pilot or manual position, transfer valve means actuated by said switching device to one of two positions, said transfer valve means being movable rapidly to one position when said switching device is in automatic pilot position, and said transfer valve means having a delayed movement to a second position when said switching device is placed in manual position, thereby providing for operation of the steering member either by said automatic pilot control means or by said manually operable control member.

References Cited in the file of this patent

UNITED STATES PATENTS

| | | |
|---|---|---|
| 1,154,591 | Dodge | Sept. 21, 1915 |
| 1,628,603 | Ferris | May 10, 1927 |
| 2,441,044 | Tate | May 4, 1948 |
| 2,536,198 | Matner | Jan. 2, 1951 |
| 2,678,177 | Chenery | May 11, 1954 |
| 2,705,940 | Edwards | Apr. 12, 1955 |